July 20, 1926.  1,593,051
S. E. WOODWORTH
FILTER MEDIUM SUPPORT
Filed Jan. 30, 1924   3 Sheets-Sheet 2

Inventor
SELIM E. WOODWORTH.
By Dewey, Strong,
Townsend & Loftus
Attys.

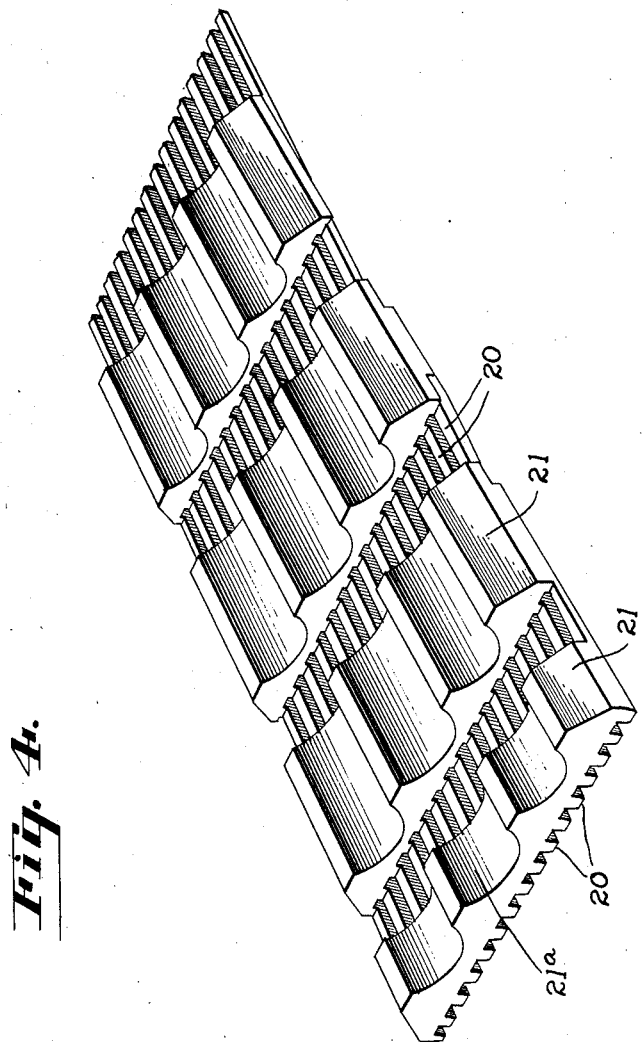

Patented July 20, 1926.

1,593,051

UNITED STATES PATENT OFFICE.

SELIM E. WOODWORTH, OF SAN FRANCISCO, CALIFORNIA, ASSIGNOR TO HAMILTON, BEAUCHAMP & WOODWORTH, OF SAN FRANCISCO, CALIFORNIA, A PARTNERSHIP COMPOSED OF E. M. HAMILTON, F. A. BEAUCHAMP, AND S. E. WOODWORTH.

FILTER-MEDIUM SUPPORT.

Application filed January 30, 1924. Serial No. 689,531.

This invention relates to filters of the continuous rotary drum type, and especially to a filter medium support therefor.

The type of filter illustrated in the present application consists of a revolving drum or cylinder, the lower portion of which is submerged in a tank containing the material to be filtered. The drum is supported on hollow trunnions from which radiate a plurality of arms, which serve as a support for the peripheral shell. This shell is hollow, consisting of an inner air and water-tight backing and an outer surface which forms the filtering medium. The space between the two surfaces is divided into shallow compartments by division strips positioned parallel to the axis of the drum. The outer surface of each compartment is covered by a filter medium support which acts as a backing for the filtering medium, and the general structure of the filter medium support is such as to insure a rigid, smooth surface under the filtering medium proper and the cake formed thereon. The choice of filter medium employed depends upon the nature of the pulp to be handled, being most commonly cotton or woolen cloth, or in some instances metal wire cloths, especially woven.

Each compartment forms virtually an independent unit, although the filtering medium is attached as a continuous sheet over the whole surface of the drum. This is due to the fact that the hollow interior of the drum is provided with a system of radially extending pipes, which connect each compartment with an automatic valve; this valve controlling the application of vacuum and the admission of compressed air or steam. The automatic valve, in fact, controls the whole cycle of operations; that is, the formation of the cake, washing, drying and discharge thereof.

The speed at which the drum is rotated depends upon the filtering characteristics of the material treated. It may be as fast as one revolution in one minute, or as slow as one revolution in ten minutes, and to insure a uniform deposit or cake on the surface of the filtering medium, an agitator is employed, this agitator further serving the function of preventing heavy particles from settling, and also maintaining a homogeneous mixture.

As the drum rotates the filtering surface is passed through every part of the agitated mass. Immediately each compartment under vacuum is immersed, a cake begins to build and continues building to the point of emergence from the pulp. The liquid passes through the filter medium and the vacuum pipes to the automatic valve, while the solid particles adhere to the drum surface or filtering medium in a thin uniform cake.

Immediately the solution disappears beneath the surface of the cake, the wash may be applied, for instance, by the application of a spray. This effects a thorough wash of the cake without mixing of solutions.

As the drum continues to rotate and a given compartment passes out of the wash zone, the vacuum is cut off, compressed air is automatically turned on by a different port in the valve, the cake is loosened and cleaned off by a scraper, and a clean filter surface passes forward to immersion and the commencement of a new cycle.

In actual practice it is found that the cake removed by the compressed air and the scraper is often accompanied by an excess of moisture. This is of importance whether the cake has been submitted to a washing action or not but especially so in the latter case as the solution retained may contain a considerable proportion of metal values in solution.

Experience has shown that when the structure that supports the filtering medium is composed of narrow horizontal grooves parallel to the axis of the drum, as is usually the case in most modern filters of this type, a perfect drainage is not obtained, a considerable amount of the solution being retained by capillarity in the angles of the grooves and being blown back and discharged with the cake when the compressed air is applied. The object of the present invention is to overcome this defect by providing a structure which will not retain any of the solution or, in other words, which will permit perfect drainage and removal of the solution while the compartments are subjected to the vacuum action.

The construction of the filter medium support forming the subject matter of the present application will be more fully described in the following description and illustrated in the accompanying drawings, in which—

Fig. 4 is a bottom view in perspective of the filter medium support.

Figure 1:
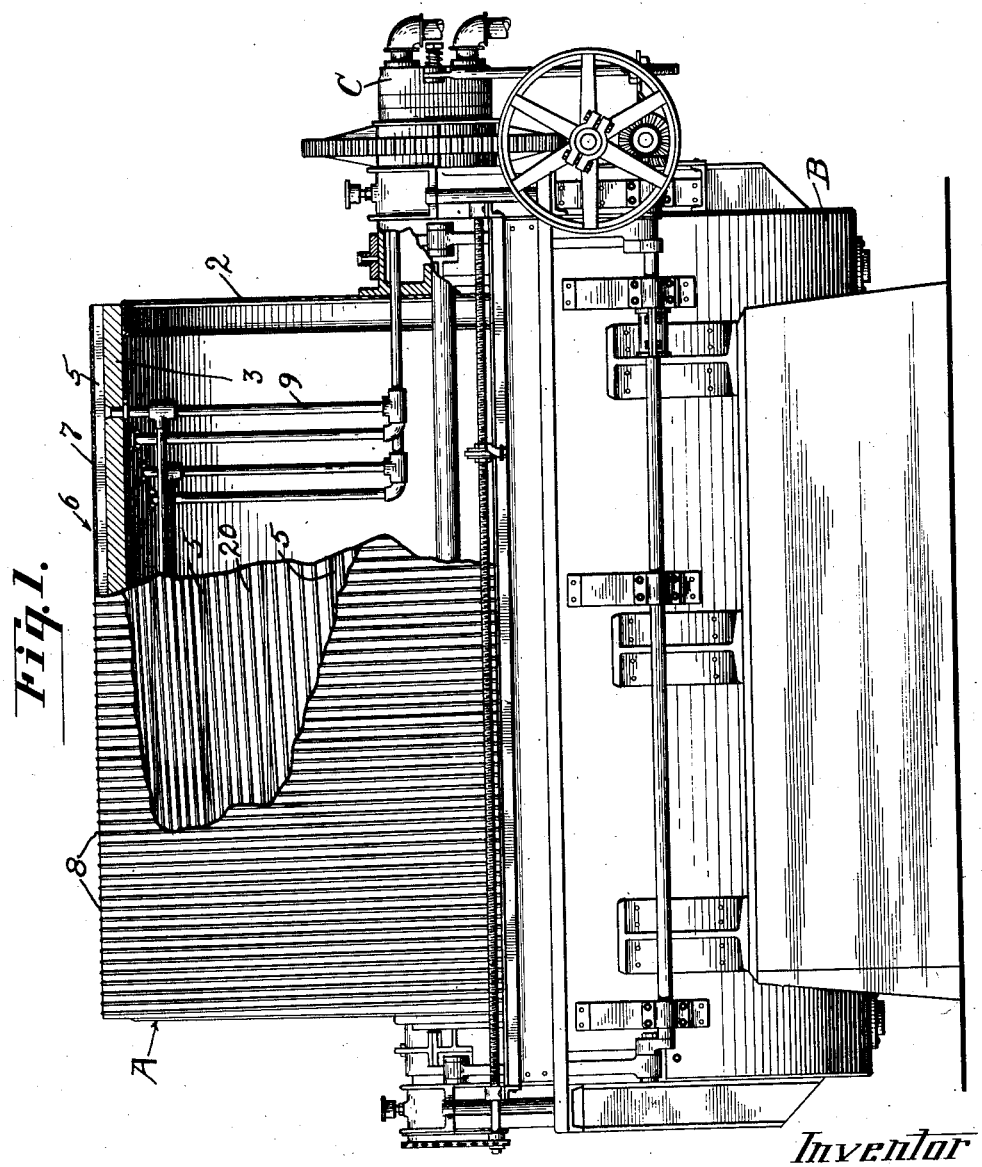
Fig. 1 is a side elevation of the filter, said elevation being partially broken away and partially in section.
Figure 2:
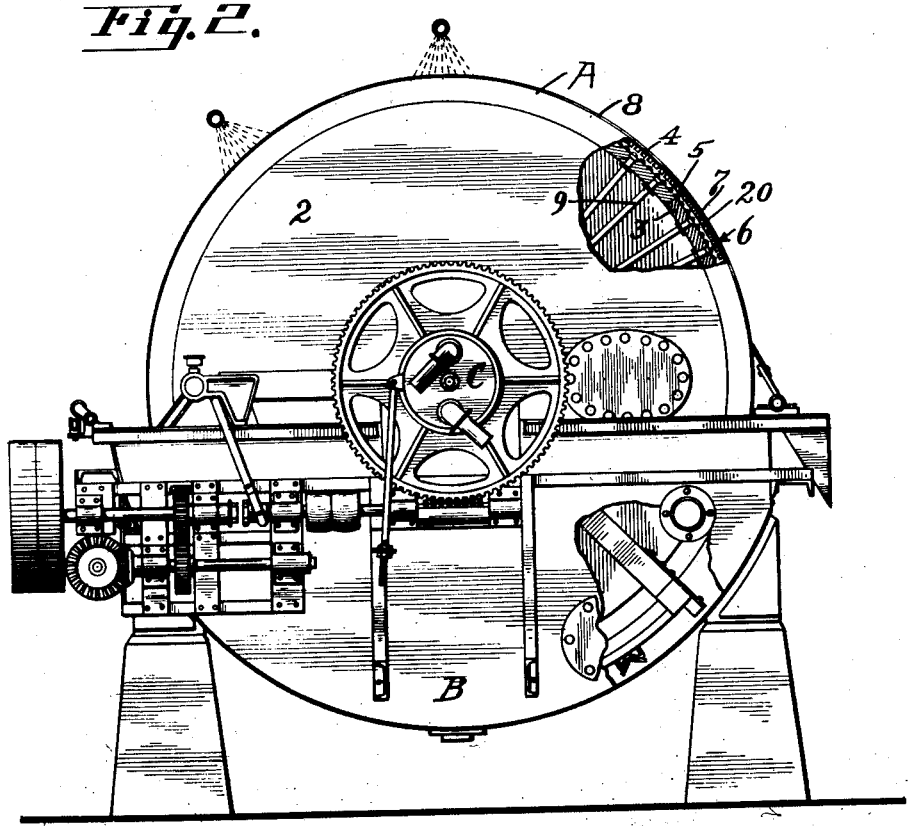
Fig. 2 is an end view thereof.
Figure 3:
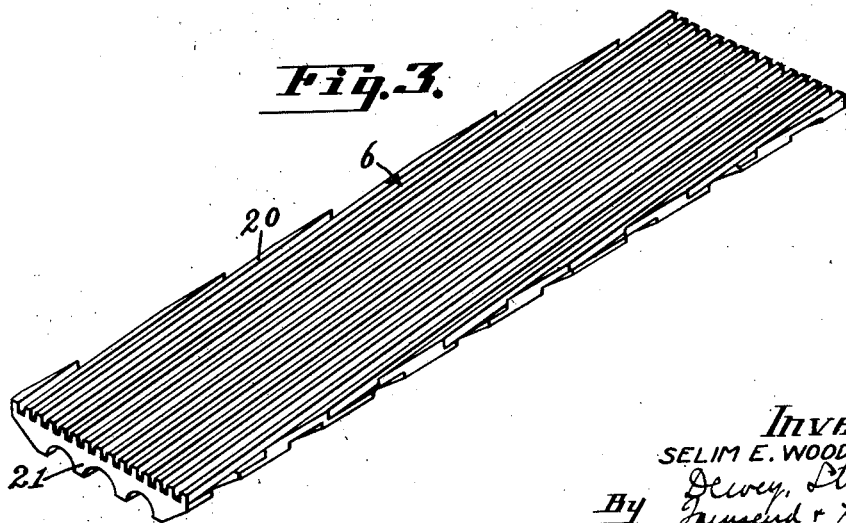
Fig. 3 is a perspective view of one of the supporting sections.

The continuous filter illustrated in Figs. 1 and 2 consists of a drum or cylinder, generally indicated at A, with the lower portion submerged in a tank B containing the material to be filtered. The drum consists of a shell supported by head members 2 disposed at each end thereof. The shell is hollow and consists of an inner air and watertight backing such as indicated at 3 and an outer surface which forms the filtering medium. The space between the two surfaces is divided into shallow compartments 4 by means of division strips 5 which are positioned parallel to the axis of the drum. The outer surface of each compartment is covered by a structure or filter medium support, generally indicated at 6, which acts as a backing for the filtering medium, the general form of the structure or filter medium support being such as to insure an approximately rigid and smooth surface under the filtering medium proper and the cake to be formed thereon. The choice of filter medium employed will depend upon the nature of the pulp to be handled, being most commonly cotton or woolen cloth, such as illustrated at 7, or in some instances metal wire cloths, especially woven.

The filtering medium is held in place by an evenly spaced wire 8 wound spirally around the the drum to secure the cloth and to protect it from wear.

Each compartment forms virtually an independent unit, although the filtering medium is attached as a continuous sheet over the whole surface of the drum. This is due to the fact that the hollow interior of the drum is provided with a system of radially disposed pipes connecting each compartment with the automatic valve, generally indicated at C, which controls the application of vacuum and the admission of compressed air or steam; these pipes being so arranged as to give the best drainage from each compartment regardless of their position during rotation.

The automatic valve controls the whole cycle of operations; that is, the formation of the cake, washing, drying and discharge thereof. The valve consists of a flat plate having a number of round ports formed therein, the number of ports corresponding to the compartments on the surface of the filter drum; the pipes for vacuum or compressed air connecting the compartments and the ports respectively, being generally indicated at 9.

The valve chamber has annular ports formed therein corresponding to the different stages in the cycle of cake formation, such as the formation of the cake, washing and discharge thereof.

The tank illustrated at B is provided with an agitator, the function of which is to prevent heavy particles from settling, and furthermore that of maintaining a homogeneous mixture so that a cake of uniform texture may be formed.

The speed at which the drum is rotated depends upon the filtering characteristics of the material treated. It is fairly fast in some instances and exceedingly slow in other instances.

Mounted on the discharge side of the tank is a flexible steel scraper which bears lightly against the wire winding and thereby removes the cake as it is loosened by compressed air. Below the scraper is an apron which directs the discharged cake onto a belt conveyor, from where it may be carried to any convenient point.

The general construction so far described is not new, but is submitted so that a clear understanding of the invention will be possible. It is therefore thought that the following statement regarding the general operation will also be of benefit.

In actual operation the material to be filtered is fed into the open tank B in a steady stream. A homogeneous mixture is obtained by agitation, as previously described. As the drum rotates the filtering surface is passed through every part of the agitated mass. Immediately each compartment under vacuum is immersed, a cake begins to build and continues building to the point of emergence from the plup. The liquid passes through the filter medium, the filter medium support, the respective compartments and the vacuum pipes to the automatic valve, while the solid particles adhere to the drum surface and as such forms a thin uniform cake.

Immediately the solution disappears from the surface of the cake, wash water may be applied in the form of a spray or otherwise. This effects a thorough wash without mixing of solutions as the automatic valve can be adjusted so that one or more washes may be applied and the filtrates kept separate.

As the drum continues to rotate and a given compartment passes out of the wash zone, the vacuum is cut off, compressed air is automatically turned on by a different port in the valve, the cake is loosened and finally removed by the scraper. A clean filter surface is thus presented and passes forward to immersion and the commencement of a new or repeat cycle. The whole process is therefore absolutely continuous and automatic, and there is no break in the various stages of the cycle.

When the filter is used for dewatering only without washing of the cake, spray pipes are eliminated, and a maximum vacuum is maintained on the upper part of the drum. Under these conditions, and with many materials a cake may be dried to a point where it is discharged with as low as from six to eight per cent moisture, but this is not often the case as the moisture content is as a rule much greater, the difference being due to the variable nature of the material to be filtered. In addition to the actual moisture in the cake, experience has shown that there is a loss of additional moisture due to the fact that the screens placed in the respective compartments below the filtering medium have a tendency to trap and mechanically carry a certain amount of solution. This solution is blown out through the filtering medium when the compressed air is applied, and it is therefore permanently lost as it passes off with the cake when removed. It is this loss which is objectionable and which has been to a large extent prevented by the type of screen illustrated in this application.

The filter medium support may be constructed of any suitable material but preferably of wood. The support is constructed in sections each section fitting a compartment. The support consists of a plurality of interspaced, longitudinally extending strips or bars 20. These are disposed on a slight incline with relation to the longitudinal axis of the drum and their outer faces form a support for the filtering medium. Their inner faces are supported by transversely extending spacing blocks such as shown at 21, and the liquid extracted from the cake is thus permitted to pass freely between the bars and the spacing blocks into the respective compartments, where it collects on the inner drum surface 3 and is removed by the suction or vacuum pipes. No liquid is trapped or entrained by the longitudinally extending bars as the inclined position assumed permits the solution to freely drain into the respective compartments. The pipes 9 are connected with the ends of the compartments and a free flow of the liquid from end to end of the compartments below the filter medium supports is therefore necessary. Such flow of the liquid is permitted as the spacing blocks have recesses formed in their lower surfaces as indicated at 21ª through which the liquid freely flows to the ends of the compartments when a vacuum is applied to pipes 9. It is thus completely removed and cannot be blown back into the cake. This is the feature which forms the subject matter of the present application and, as previously stated, has solved the problem of the discharge of the excess moisture with the cake.

In actual practice it is preferable to construct the filter medium-supporting sections of wood, either of one piece or built up. These sections are flat but the grain of the wood in each filter medium support section is so arranged as to run parallel to the axis of the drum, thus permitting each filter medium support section to be bent to take the exterior curvature of the drum. It is, however, obvious that the grain of the wood need not be parallel to the axis of the drum as the filter medium support might be manufactured with the curve of the drum surface cut in it. This would, however, make the supports a little more expensive as there are a variety of makes of drums, and also drums of varying diameters which would necessitate especially made supports for each drum. It is therefore preferable to make the supports flat with the strips on an incline, but the grain so arranged as to run parallel with the axis of the drum, thus permitting each section to be readily bent.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. The combination with a filter drum of the character described, of a filter medium surrounding the drum, and a support interposed between the drum and the filter medium, said support comprising a plurality of interspaced strips adapted to form a spacing between the drum and the filter medium, said strips being disposed on an angle with relation to the longitudinal axis of the drum.

2. The combination with a filter drum of the character described and the plural compartments formed in its exterior surface, of a filter medium surrounding the drum and the plural compartments, and a means positioned in each compartment and forming a support for the filter medium, said means consisting of a plurality of interspaced strips disposed on an angle with relation to the longitudinal axis of the drum, said strips forming a support for the filter medium, and a plurality of spacing blocks disposed between the drum and the strips and forming a part of the filter medium support.

3. A filter medium support of the character described comprising a plurality of interspaced strips disposed in parallelism with relation to each other, and a plurality of blocks forming a support and a backing for the strips, said blocks being interspaced and being disposed substantially at right angles to the longitudinally extending strips.

4. In a filter drum of the character described, a filter medium support, said support being substantially rectangular in shape and consisting of a plurality of interspaced strips disposed on an angle with relation to the parallel sides of the rectangle, and spacing blocks supporting the strips and disposed at right angles to the sides of the rectangle.

5. In a filter drum of the character described, a filter medium support, said support being substantially rectangular in shape and consisting of a plurality of interspaced strips disposed on an angle with relation to the parallel sides of the rectangle, and spacing blocks supporting the strips and disposed at right angles to the sides of the rectangle, said strips and blocks being constructed of wood, and the grain of the wood running parallel with the parallel sides of the rectangle.

6. A support of the character described comprising a plurality of interspaced parallel strips, said strips forming a rectangular shape, and said strips being disposed on an angle with relation to the parallel sides of the rectangle, spacing blocks formed integral with the strips and disposed at right angles to the parallel sides of the rectangle, said strips and spacing blocks being constructed of an integral section of wood, the grain in said wood being disposed on an angle to the strips and running parallel with the spacing blocks and the parallel sides of the rectangle.

SELIM E. WOODWORTH.